Nov. 2, 1948.     F. M. HOLLOWAY ET AL     2,453,091
SPIRIT LEVEL
Filed March 27, 1947
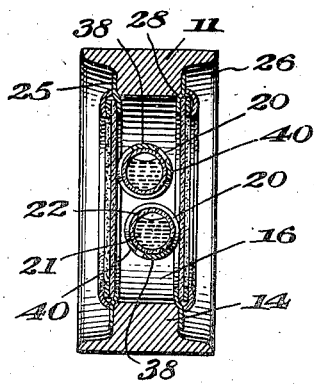
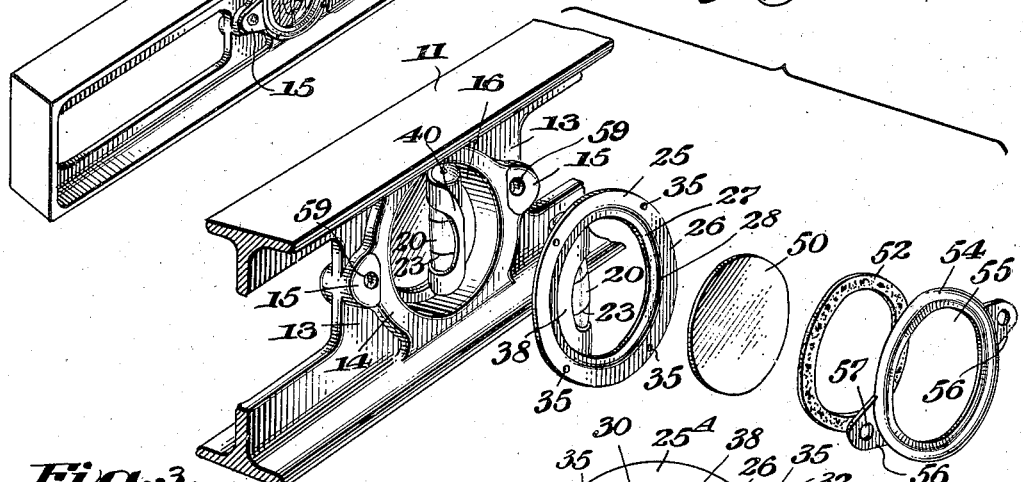
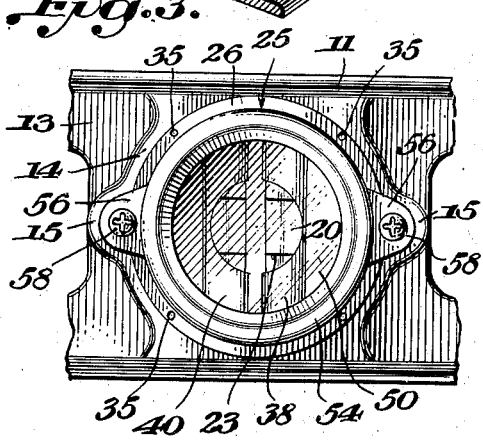
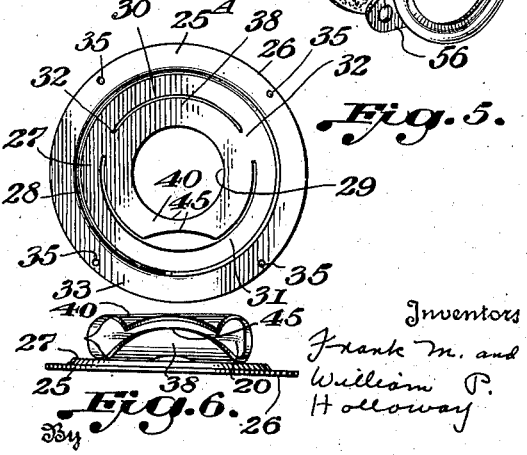
Inventors
Frank M. and William P. Holloway
By Watson, Cole, Grindle & Watson Attorneys Patented Nov. 2, 1948

2,453,091

UNITED STATES PATENT OFFICE 2,453,091

SPIRIT LEVEL

Frank M. Holloway and William P. Holloway, Austin, Tex.

Application March 27, 1947, Serial No. 737,528

16 Claims. (Cl. 33—211)

This invention relates to spirit levels for use by carpenters, masons, or other artisans, and more particularly to means and methods of installing, supporting, retaining, calibrating, and exhibiting the bubble vials of such instruments.

The general object of the invention is the provision of a novel and improved level of the class described, and a novel and improved method of applying the vials thereto which may be pursued by unskilled persons and still result in an accurate setting and indexing of the vials.

One of the important features of the invention involves the provision of novel semi-rigid disk-like vial supports which may be accurately and very economically produced by die-stamping in accordance with mass production methods.

In its preferred embodiment, the invention contemplates the provision of a level comprising the conventional frame or stock having trued edge surfaces and provided with preferably circular openings or recesses in the side walls thereof for the reception of the vial and window assembly. The novel die-stamped vial-supporting disk or ring is provided with bendable portions which are adapted to firmly grip the vial and hold it in a set position when the supporting member is fixed in its final adjusted position.

The bendable gripping parts of the vial support are conformed to the slightly arcuate shape of the vial which it is to receive, and this permits a preliminary adjustment of the vial in the support or holder about the center of curvature, and thus it is capable of being shifted in the vertical and horizontal planes simultaneously.

Preferably the gripping portions of the vial holder are somewhat resilient so that they may be expanded or contracted to receive vials of varying sizes.

The novel method of assembly and adjustment afforded by the invention involves the preliminary adjustment of the vial in the holder or support as already indicated, and also the final adjustment of the setting of the vial holder itself with relation to the rectilinear surfaces of the level, after preliminary attachment of the holder to the stock of the level by means of the bezel-like retaining member which is adapted to secure both the vial holder and the glass or plastic window through which the bubble is to be observed.

Other objects and features of novelty will be apparent from the following specification when read in connection with the accompanying drawings in which one embodiment of the invention is illustrated by way of example.

In the drawings:

Figure 1 is a perspective view of a carpenter's or mason's level embodying the principles of the invention;

Figure 2 is a fragmentary exploded perspective view of a section of the level showing clearly the construction of the vial assembly;

Figure 3 is a fragmentary view in side elevation of one of the vial carrying portions of the level;

Figure 4 is a view in transverse vertical section taken on line 4—4 of Figure 1;

Figure 5 is a plan view of a prepared blank from which a vial supporting member is fashioned; and Figure 6 is a top view of the completed vial support with a vial cemented in place therein.

Although the principles of the present invention may be readily applied to wooden levels or to small levelling gauges of various sizes and configurations, it is shown in the accompanying drawings, for purposes of illustration, as applied to an oblong carpenter's or mason's level having a somewhat skeletonized metal frame with webs provided at intervals for supporting and containing the bubble-vials. So, in Figure 1 of the drawings the level is indicated generally by the reference numeral 10 and the numeral 11 denotes the metal stock or frame of the level. The stock is provided with smooth true surfaces on their upper, lower, and end edges. In transverse cross-section, the stock 11 is substantially I-shaped, the web of the section being broken away at intervals as indicated at 12 in order to lighten the weight of the level, without weakening its structure unduly.

The remanent portions of the webbing shown at 13 are thickened to provide widened or embossed substantially circular portions 14 having ears or extensions indicated at 15 at either side thereof.

The circular embossments 14 define an opening 16 which in the illustrated embodiment passes all the way through the level stock 11, but which so far as the broader aspects of the invention are concerned, may pass but partially through the stock and comprise merely a recess let into the side wall of the stock. The provision of an opening 16 which passes all the way through the stock is advantageous in that it provides for the installation of a pair of bubble-vials within the same opening, each of which may be read to determine the level of one side or the other of the instrument, or of one end or the other of the stock if the instrument is being used to plumb a vertical line or surface.

When two vials are to be installed within a single opening, as shown in the drawings, they are overlapped, as clearly indicated in Figure 4 of the drawings, and occupy complementary positions within the opening, although their supporting means are secured at opposite ends of the substantially cylindrical opening 16. Since the vials, the observation window, and the securing and adjusting devices are exactly the same in the case of each vial, the assembly at one end of the opening 16 will be described and similar reference numerals applied to the assembly at the opposite end of the opening. The sequence and manner of assembling the various parts is clearly indicated in the exploded view in Figure 2.

The vials used in the present construction preferably comprise short glass cylinders 20 which are very slightly arcuate from end to end and which contain a suitable liquid 21 which fills the vial except for a small bubble 22 which is adapted to be centered between the circumferential lines or marks 23 inscribed upon the glass tube 20.

Each of the vials is carried by a vial support 25 which is made of sheet metal of a semi-rigid and somewhat resilient character, and well adapted to be made by mass production methods. One of the die-stamped blanks of which the support 25 is made is indicated at 25A in Figure 5 of the drawings. The blank is circular and is provided with an outer flange 26 which is offset to some extent from the plane of the inner flat surface 27, a circular shoulder 28 separating these two surfaces. A circular central opening 29 is formed by cutting out the material at the center of the disk. The inner surface 27 of the blank is slit arcuately at 30, and also at 31 to a greater arcuate extent, the two arcuate slits being separated upon either side of the upper portion of the member by the solid unslit portions 32. At the lower mid-portion of the larger arcuate slit 31 a lenticular section of the disk is cut away as clearly shown at 33.

Preferably at the same time that the blank is cut out, stamped, and slit as described, four small holes 35 are formed in the outer marginal flange 26 of the holder, these holes being spaced 90° apart around the disk.

It will be noted that the arcuate slit 30 defines a partly circular lip 38 which may be bent inwardly from the plane of the surface 27, and that the slit 31 and the cut-away portion 33 defines a substantially semi-circular tab which may also be curled or bent from the plane of the disk portion 27, and both of these curved projecting portions are adapted to be wrapped around a vial 20 to securely grip it and hold it rigidly with respect to the vial support 25. In various figures of the drawings it will be clearly seen how the lip or strap portion 38 overlaps a portion of the vial while the bent-out projection or strap portion 40 is wrapped around the major portion of the vial and the two parts 38 and 40 serve to grip the vial firmly. The two bent-out portions 38 and 40 as they are wrapped firmly around the vial are conformed to the arcuate shapes of the vials, and being somewhat resilient, they can be made to receive vials of varying diameters. Also the cooperating gripping portions 38 and 40 which are united with the body portion of the support 25 by the bridging inner connecting portions 32, are open at the ends, and thus may support vials of varying lengths. Furthermore, the central opening 29 provides for exposing the central portion of the vial to view so that the position of the bubble 22 with respect to the index lines 23 may be readily observed. Finally, the cut-away portion 33 narrows and conforms the central part of the bent-out strap portion 40 as at 45, so as to conform to the curvature of the lip portion 38 and provide for clearance between these portions when vials of relatively smaller diameters are used. This feature is clearly shown in Figure 6 of the drawings.

In positioning the vial 20 within the holder 25 the holder is preferably supported in a jig comprising an upright and two or more prongs or spindles projecting outwardly therefrom to enter certain of the openings 35 in the rim portion 26 of the holder. This assures the exact rectilinear positioning of the holder 25 in accordance with its final position of adjustment in the ends of the opening 16 of the stock of the level, and the vial 20 is adjusted within the gripping portions 38 and 40 by arcuate movement along the curvature of the vial until the bubble is centered. Then the vial 20 and the gripping portions of the holder 25 are coated with a transparent, hardening, cementing material, such as for example a pure white shellac. This prevents relative movement of the vial and holder without obscuring the reading of the vial.

Next, as suggested in Figure 2, the transparent disk 50, which may be made of the glass or other suitable plastic, is fitted within the shoulder 27 of the vial holder 25 and against the surface of the inner disk portion 27. Then the packing member or gasket 52 is applied, this element overlapping the edges of the transparent disk 50. The gasket 52 may be made of cork or any other suitable material.

Then the outer retaining ring or bezel 54 is applied to the assembly, at least a portion of the gasket 52 being seated within the inner groove of the ring 54. The ring 54 is provided with a central opening 55 which of course provides a window opening covered by the pane 56 through which the vials may be observed. The retaining ring 54 is provided with two or more outwardly extending ears 56 provided with openings 57 through which the screws 58 may pass, these screws being adapted to enter the threaded openings 59 in the extension bosses 15 of the webs 13 of the stock of the level.

As will be clearly noted from Figures 2 and 3 of the drawings, the vial holder 25, which is first applied to the stock, is received within the margins of the opening 16, the shoulder 28 being fitted accurately to these margins, with the vial in an approximately correct postion. It will be noted further that the marginal portion 26 of the holder 25 projects radially outwardly beyond the perimeter of the retaining ring 54 so that the holes 35 are exposed. When the various parts are assembled within the margins of the opening 16 in the level, the screws 58 are turned down to a point where the parts are temporarily and frictionally retained in place, but where some relative movement of the holder 25 may be had with relation to the gasket 52 and the surface of the stock. The stock 11 is then placed in a truing jig which holds it in a perfectly level position. Then a suitably formed tool or wrench having one or more prongs adapted to enter certain of the openings 35 in the margins of the holder 25 is applied to the vial holder 25 rotated in the proper direction and to the necessary extent to center the bubbles in the vials. When this final adjustment is effected, the screws 58 are turned home and the vial holder 25 is frictionally retained securely in place.

Obviously, if any subsequent correction is necessary, the screws 58 may be loosened slightly and the vial holder 25 restored to its proper position by the necessary rotation. Furthermore, in the event that the vials are to be adjusted to indicate any desired angularity of the stock the holders may be properly rotated and then clamped tightly in position by means of the screws 58.

It is understood that various changes and modifications may be made in the embodiment illustrated and described herein without departing from the scope of the invention as defined by the sub-joined claims.

Having thus described the invention, what is claimed as new and desired to be secured by Letters Patent is:

1. A level of the class described comprising in combination, a stock, means on said stock for receiving a bubble-vial and its holder, a bubble-vial, a holder for said vial comprising a substantially circular disk having medially disposed means thereon retaining said vial and substantially circular marginal portions lying against a surface of said stock, substantially annular means for covering said holder and vial and frictionally clamping said marginal portions of the holder against the stock with varying degrees of pressure, and peripheral portions on said holder disk projecting radially outwardly beyond said annular means for manipulating the disk, whereby said support may be shifted for adjustment of the vial to a proper zero position while under less than maximum pressure and may be securely held in operative position by the application of greater clamping pressure.

2. A level of the class described comprising in combination, a stock having a bubble-vial receiving opening therein, a vial disposed within said opening, a vial holder comprising means for receiving the vial and an annular rim plate lying against the outer margins of said opening and capable of rotary adjustment about said margin to properly index the vial, a bezel-like retaining ring overlying said rim plate of the vial holder, and means for securing said retaining ring to the stock whereby it will press said plate firmly against the margins of the opening in the stock and retain the holder in adjusted position solely by friction, a transparent window disk applied exteriorly to said holder and adapted to cover the opening in said stock wherein the vial is disposed, a gasket overlying the margin of said window disk and at least a portion of said rim plate, and intervening between these last named elements and the superposed retaining ring, whereby said ring not only holds the vial holder in adjusted position but also frictionally retains the window in place on the stock.

3. A level of the class described comprising in combination, a stock having a bubble-vial receiving opening therein, a vial disposed within said opening, a vial holder comprising means for receiving the vial and an annular rim plate lying against the outer margins of said opening and capable of rotary adjustment about said margin to properly index the vial, a bezel-like retaining ring overlying said rim plate of the vial holder, and means for securing said retaining ring to the stock whereby it will press said plate firmly against the margins of the opening in the stock and retain the holder in adjusted position solely by friction, the said rim plate of the vial holder extending radially outwardly beyond the clamping ring and provided on its extended portion with manipulative means for engagement for shifting said holder when the frictional pressure is released.

4. A level of the class described comprising in combination, a stock having a bubble-vial receiving opening therein, a vial disposed within said opening, a vial holder comprising means for receiving the vial and an annular rim plate lying against the outer margins of said opening and capable of rotary adjustment about said margin to properly index the vial, a bezel-like retaining ring overlying said rim plate of the vial holder, and means for securing said retaining ring to the stock whereby it will press said plate firmly against the margins of the opening in the stock and retain the holder in adjusted position solely by friction, the said rim plate of the vial holder extending radially outwardly beyond the clamping ring and provided on its extended portion with calibration holes for engagement by a suitable tool for shifting said holder when the frictional pressure is released and also serving to receive portions of a steady-rest jig while the vial is attached thereto.

5. In a spirit level of the class described, a bubble-vial assembly which comprises a vial containing a fluid and a bubble, a circular disk slit at its medial portion along two nearly conjugate circular arcs, the terminals of the respective arcs being spaced apart for slight distances by uncut bridging portions, the resulting segmental lips of the medial portion of the disk being curled out of the plane of the disk to envelop the vial from both sides.

6. In a spirit level of the class described, a bubble-vial assembly which comprises a vial containing a fluid and a bubble, a circular disk slit at its medial portion along two nearly conjugate circular arcs, the terminals of the respective arcs being spaced apart for slight distances by uncut bridging portions, the resulting segmental lips of the medial portion of the disk being curled out of the plane of the disk to envelop the vial from both sides, an opening formed in the center of the disk within the arcuate slits whereby the curled lips take the form of arcuate straps embracing the vial, and whereby the bubble-containing part of the vial is exposed to view.

7. A blank for producing a bubble-vial holder for spirit levels and the like comprising a semi-rigid disk, having a continuous annular rim portion, a pair of arcuate slits inwardly of the rim portion, the two slits together forming a complete circle but for short gaps of uncut metal at the ends of the slits, and a substantially circular hole in the center of the disk.

8. A blank for producing a bubble-vial holder for spirit levels and the like comprising a semi-rigid somewhat resilient disk, having a continuous annular rim portion, an annular shoulder around said rim portion producing an offset marginal edge, a pair of arcuate slits inwardly of the rim portion, the two slits together forming a complete circle but for short gaps of uncut metal at the ends of the slits, a substantially circular hole in the center of the disk and an opening in the disk at the approximate mid-point of one of the arcuate slits.

9. In a spirit level of the class described, a unitary bubble-vial installation assembly, which comprises a vial containing a fluid and bubble, and a substantially annular disk of readily pliable yet somewhat resilient sheet material, a radially inward portion integral with said disk, bent out of the plane of the disk, and wrapped around said vial with resilient gripping tension.

10. In a spirit level of the class described, a unitary bubble-vial installation assembly, which comprises a vial containing a fluid and bubble, and a substantially annular disk of readily pliable yet somewhat resilient sheet material, a substantially arcuate strap-like intermediate portion disposed radially inwardly of said disk, integrally connected with the marginal portions thereof at both of the ends of said intermediate portion, and having its substantially arcuate medial portion bent out of the plane of said marginal portion and wrapped around said vial with resilient gripping tension.

11. In a spirit level of the class described, a unitary bubble-vial installation assembly which comprises a vial containing a fluid and bubble, and a substantially annular disk of pliable sheet material having a circular opening centrally thereof and having an arcuate slit around a sector of the annular portion, the margin of said opening and said slit bounding an integral arcuate strap, said strap being bent adjacent its ends out of the plane of the annular portion and wrapped around said vial to support the latter, the concavity of one side of the arcuate strap affording a sight opening for viewing the bubble.

12. The bubble-vial assembly as set forth in claim 11 in which adjacent portions of the vial and of the vial-supporting strap are coated with a transparent cementing material.

13. The bubble-vial assembly as set forth in claim 11 in which the remanent annular portion is shouldered as for fitting within an opening in a level stock, and also provided upon its radially outermost portions with at least one manipulative means, as for rotatively adjusting said assembly within such level stock opening.

14. A level of the class described comprising, in combination, a stock, an opening in said stock for receiving a bubble-vial and its holder, a bubble-vial, a holder therefor, said holder being a substantially annular disk of pliable sheet material having a circular opening centrally thereof, an arcuate slit around a sector of the annular portion, the margin of said opening and said slit bounding an integral arcuate strap, said strap being bent adjacent its ends out of the plane of the annular portion and wrapped around said vial to support the latter, the concavity of one side of the arcuate strap affording a sight opening for viewing the bubble, the outer marginal portions of said holder overlying the margins of the opening in the stock, a bezel-like retaining ring overlying the remanent annular portion of said holder and in firm frictional retaining contact therewith substantially throughout the annular extent of said holder and said ring, and fastening elements securing said retaining ring directly to said stock.

15. In a spirit level of the class described, a unitary bubble-vial installation assembly, which comprises a vial containing a fluid and bubble, a substantially circular disk of pliable sheet material having an opening centrally thereof, a slit in said disk extending around a sector thereof of less than 360° of circumference of the disk, said slit being spaced from both the periphery of the disk and the margin of the central opening, the slit and an adjacent portion of the margin of said opening bounding an integral approximately U-shaped strap, said strap being bent adjacent its ends out of the plane of the disk and wrapped around said vial to support the latter, the space within the bight of the U-shaped strap affording a sight opening for viewing the bubble.

16. In a spirit level of the class described, a unitary bubble-vial installation assembly, which comprises a vial containing a fluid and bubble, a substantially circular disk of pliable sheet material having an opening centrally thereof, a pair of slits in said disk extending around nearly conjugate sectors thereof totalling less than 360° of circumference of the disk, said slits being spaced from both the periphery of the disk and the margin of the central opening, each slit and an adjacent portion of the margin of said opening bounding an integral approximately U-shaped strap, said straps being bent adjacent their ends out of the plane of the disk and wrapped around said vial to support the latter, said opening within the bights of the U-shaped strap affording a sight opening for viewing the bubble.

FRANK M. HOLLOWAY.
WILLIAM P. HOLLOWAY.

REFERENCES CITED

The following references are of record in the file of this patent:

UNITED STATES PATENTS

| Number | Name | Date |
| --- | --- | --- |
| 666,843 | Bownell | Jan. 29, 1901 |
| 668,015 | Morrison | Feb. 12, 1901 |
| 742,010 | Davis | Oct. 20, 1903 |
| 760,587 | Traut | May 24, 1904 |
| 813,561 | Leonhart | Feb. 27, 1906 |
| 815,690 | Dimick | Mar. 20, 1906 |
| 954,074 | Bodmer et al. | Apr. 5, 1910 |
| 1,159,522 | Miller | Nov. 9, 1915 |
| 1,205,956 | Adkins | Nov. 28, 1916 |
| 1,254,469 | Burke | Jan. 22, 1918 |
| 1,435,365 | Ziemann | Nov. 14, 1922 |
| 1,456,431 | Frank | May 22, 1923 |
| 1,624,161 | Day | Apr. 12, 1927 |